United States Patent [19]

Taniguchi et al.

[11] Patent Number: 4,978,709
[45] Date of Patent: Dec. 18, 1990

[54] POLYAMIDES AND THERMOSENSITIVE IMAGE TRANSFER RECORDING MEDIUM USING THE SAME

[75] Inventors: Keishi Taniguchi, Susono; Junko Yamaguchi, Shizuoka, both of Japan

[73] Assignee: Ricoh Company, Ltd., Tokyo, Japan

[21] Appl. No.: 279,201

[22] Filed: Dec. 2, 1988

[30] Foreign Application Priority Data

Dec. 3, 1987 [JP] Japan ................. 62-306285
Dec. 28, 1987 [JP] Japan ................. 62-332988
Mar. 17, 1988 [JP] Japan ................. 63-65245

[51] Int. Cl.$^5$ .................. C08L 77/06; C08L 77/10; C09D 11/10
[52] U.S. Cl. .................. 524/606; 528/338; 524/607; 106/20
[58] Field of Search .......... 524/606, 607; 528/335, 528/338, 339, 340, 341; 106/20, 31, 32

[56] References Cited

U.S. PATENT DOCUMENTS 3,847,875 11/1974 Drawert et al. .......... 528/341
4,655,836 4/1987 Drawert et al. .......... 528/335
4,696,965 9/1987 Rasmussen ............. 524/380

*Primary Examiner*—Lewis T. Jacobs
*Assistant Examiner*—E. J. Webman
*Attorney, Agent, or Firm*—Oblon, Spivak, McClelland, Maier & Neustadt

[57] ABSTRACT

A thermosensitive image transfer recording medium is disclosed, which comprises (i) a heat-resistant support and (ii) a thermofusible ink layer formed on the support, comprising as the main components (a) a binder agent comprising as the main component a low-molecular-weight mixed polyamide having an ether linkage therein, having the formulas,

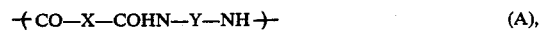 (A),

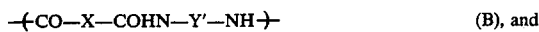 (B), and

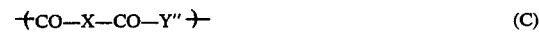 (C)

wherein S, Y, Y' and Y" are defined in the specification, and (b) a coloring agent.

5 Claims, No Drawings

POLYAMIDES AND THERMOSENSITIVE IMAGE TRANSFER RECORDING MEDIUM USING THE SAME

BACKGROUND OF THE INVENTION

The present invention relates to polyamides which are advantageous as a binder for a thermosensitive image transfer recording medium, and a thermosensitive image transfer recording medium using the same.

Generally, there is known a thermosensitive image transfer recording medium, which is called an ink ribbon. This thermosensitive image transfer recording medium is constructed in such a manner that a thermofusible ink layer comprising as the main components a coloring agent and a binder comprising a wax and/or a low-melting point resin is formed on a heat-resistant support such as a polyester film and a polyamide film. Furthermore, a release layer comprising a wax may be interposed between the support and the thermofusible ink layer when necessary.

By use of the above thermosensitive image transfer recording medium, a thermosensitive image transfer recording method is currently widely employed. According to this thermosensitive image transfer recording method, the thermofusible ink layer of the thermosensitive image transfer recording medium is melted with application of heat by a thermal head and an ink composition of the thermofusible ink layer is imagewise transferred to a recording sheet, such as a sheet of paper and a film, which sheet is superimposed on the thermosensitive image transfer recording medium, opposite to the thermal head with respect to the recording medium.

The thermosensitive image transfer recording method has the advantages that the recording apparatus therefor is compact in size, relatively cheap and maintainable, and this method is capable of yielding images steadily and quietly.

However, conventional thermosensitive image transfer recording media cannot realize excellent thermal image transfer performance and fixing performance of images and cannot yield images with a satisfactory resolution and clearness when high-speed printing is conducted.

The conventional thermosensitive image transfer recording medium comprising a thermofusible ink layer in which a wax is used as a binder has high thermosensitivity to the heat of the thermal head. Accordingly, the thermofusible ink layer of this thermosensitive image transfer recording medium is swiftly melted with application of heat by the thermal head and the ink composition is imagewise transferred readily to a recording sheet even when the high-speed recording is carried out, in which heat application time is very short. This thermosensitive image transfer recording medium, however, has the shortcomings that the obtained images are blurred and easily peel off the recording sheet because the fixing property of the images to the recording sheet is insufficient.

In contrast to this, when the conventional thermosensitive image transfer recording medium comprising a thermofusible ink layer in which any of styrene—butadiene copolymer, vinyl chloride—vinyl acetate copolymer, ethyl cellulose and polyvinyl butyral, the melting point for which is in the range of 60° C. to 110° C., is used as a binder, it has the shortcomings that the thermal image transfer performance of the thermofusible ink layer is very poor.

The thermosensitive image transfer recording medium comprising a thermofusible ink layer in which the combination of the above-mentioned wax and low-melting point resin is used as a binder can improve the conventional shortcomings to some extent. However, there is no thermosensitive image transfer recording medium which can solve all of the above-mentioned shortcomings.

SUMMARY OF THE INVENTION

It is therefore a first object of the present invention to provide mixed polyamides (copolyamides) serving as a binder for a thermosensitive image transfer recording medium.

Another object of the present invention is to provide a thermosensitive image transfer recording medium comprising a support and a thermofusible ink layer thereon, which ink layer contains as a binder any of the above polyamides, which is excellent in thermal image transfer performance when the high-speed recording is carried out and capable of yielding images clearly with high resolution and fixing the images on a recording sheet.

According to the present invention, the first object is attained by low-molecular-weight mixed polyamides which have an ether linkage therein.

Another object of the present invention is attained by a thermosensitive image transfer recording medium comprising a support and a thermofusible ink layer formed thereon, which thermofusible ink layer comprises as the main components a low-molecular-weight mixed polyamide having an ether linkage therein and a coloring agent.

DETAILED DESCRIPTION OF THE PREFERRED EMBODIMENTS

Specific examples of the mixed polyamides according to the present invention are as follows:

(1) Mixed polyamide No. 1 of the formula (A)

CO―(―X―COHN―Y―NH―)―    (A)

wherein X is selected from the group consisting of radicals comprising ―(―CH$_2$―)$_7$ and ―(―CH$_2$―)$_8$ at a ratio of repeating units of (20 to 100) : (80 to 0); and Y is selected from the group consisting of radicals comprising ―(―C$_3$H$_6$OC$_2$H$_4$OC$_3$H$_6$―)― and ―(―C$_3$H$_6$OC$_2$H$_4$OC$_3$H$_6$―)― at a ratio of repeating units of (20 to 80) : (80 to 20).

(2) Mixed polyamide No. 2 of the formula (B)

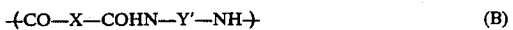

―(―CO―X―COHN―Y'―NH―)―    (B)

wherein X is the same as previously defined; and Y' is selected from the group consisting of radicals comprising ―(―C$_3$H$_6$OC$_2$H$_4$OC$_2$H$_4$OC$_3$H$_6$―)―, ―(―C$_3$H$_6$OC$_2$H$_4$OC$_3$H$_6$―)― and ―(―C$_3$H$_6$OC$_4$H$_8$OC$_3$H$_6$―)― at a ratio of repeating units of (5 to 90) : (5 to 90) : (5 to 90).

(3) Mixed polyamide No. 3 of the formula (C)

―(―CO―X―CO―Y''―)―    (C)

wherein X is the same as previously defined; and Y'' is selected from the group consisting of radicals comprising ―(―HNC$_3$H$_6$OC$_2$H$_4$OC$_2$H$_4$OC$_3$H$_6$NH―)―, ―(―HNC$_3$H$_6$OC$_2$H$_4$OC$_3$H$_6$NH―)― and

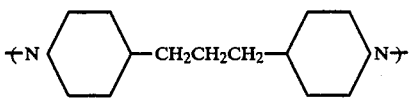

at a ratio of repeating units of (10 to 80) : (10 to 80) : (10 to 80).

It is preferable that the number-average molecular weight of the low-molecular-weight mixed polyamide according to the present invention used for the thermosensitive image transfer recording medium be in the range of 2,000 to 10,000, more preferably in the range of 2,000 to 8,000 when measured by Gel Permeation Chromatography (GPC). The low-molecular-weight mixed polyamides according to the present invention belong to the category of oligomer, and lie in the middle of the waxes and the low-melting point resins used for conventional thermosensitive image transfer recording medium, in terms of the number-average molecular weight. Therefore, the above-mentioned shortcomings of the conventional binders, especially due to the molecular weight thereof, can be eliminated when the above low-molecular-weight mixed polyamides according to the present invention are used as a binder for the thermosensitive image transfer recording medium.

When the number-average molecular weight of the low-molecular-weight mixed polyamide contained in the thermosensitive image transfer recording medium is less than 2,000, the melting point of this polyamide goes down and its physical properties are similar to those of the conventional waxes, so that the printed images tend to become blurred and easily peel off the recording sheet.

When the number-average molecular weight of the low-molecular-weight mixed polyamide contained in the thermosensitive image transfer recording medium exceeds 10,000, the melting point of this polyamide rises because of the increase in molecular weight, and accordingly, its physical properties are approaching those of the conventional low-melting point resins. As a result, the thermal image transfer performance of the thermosensitive image transfer recording medium is easily deteriorated.

Therefore, to minimize the appearance of unclear images and the deterioration of the thermal image transfer performance, the number-average molecular weight of the low-molecular-weight mixed polyamide according to the present invention is preferably in the range of 2,000 to 10,000.

The mixed polyamides according to the present invention include an ether linkage in the monomer units thereof which constitute the polyamides. Such an ether linkage may be included in the mixed polyamide as a polyether polyamide block copolymer having the moieties of the polyamide and the polyether.

It is preferable that the melting point of the mixed polyamide according to the present invention be in the range of 60° to 150° C., more preferably in the range of about 70° to 100° C.

The mixed polyamides having the formula (A) according to the present invention can be prepared, for example, by allowing a mixture of azelaoyl chloride and sebacoyl chloride at a ratio of repeated units of (20 to 100) : (80 to 0) to react with a mixture of diethylene glycol bis(3-aminopropyl)ether and ethylene glycol bis(3-aminopropyl)-ether at a ratio of repeated units of (20 to 80) : (80 to 20) by the low-temperature solution polycondensation in the presence of a catalyst such as triethylamine.

The mixed polyamides having the formula (B) according to the present invention can be prepared, for example, by allowing a mixture of azelaoyl chloride and sebacoyl chloride at a ratio of repeated units of (20 to 100) : (80 to 0) to react with a mixture of diethylene glycol bis(3-aminopropyl)ether, ethylene glycol bis(3-aminopropyl)ether and tetramethylene glycol bis[3-aminopropyl)ether at a ratio of repeated units of (5 to 90) : (5 to 90) : (5 to 90) in the same manner as mentioned above.

The mixed polyamides having the formula (C) according to the present invention can be prepared, for example, by allowing a mixture of azelaoyl chloride and sebacoyl chloride at a ratio of repeated units of (20 to 100) : (80 to 0) to react with a mixture of diethylene glycol bis(3-aminopropyl)ether, ethylene glycol bis(3-aminopropyl)ether and 1,3-di-4-piperidylpropane at a ratio of repeated units of (10 to 80) : (10 to 80) : (10 to 80) in the same manner as mentioned above.

By allowing the above-mentioned mixtures to react by low-temperature solution polycondensation in the presence of a catalyst such as triethylamine, the mixed polyamide according to the present invention can be easily obtained in a high yield and with high purity. Furthermore, the manufacturing cost is relatively low.

However, in any case where the polyamides according to the present invention having the above-mentioned formulas (A), (B) and (C) are prepared, if the ratio of repeated units of $-(CH_2)_7-$ and $-(CH_2)_8-$ contained in X is less than 20:80, or the ratio of repeated units contained in Y, Y' and Y" is not within the above-mentioned range, the melting point of the obtained mixed polyamide becomes so high that the thermal image transfer performance tends to deteriorate.

According to the present invention, other mixed polyamides having an ether linkage therein can be obtained in the same manner as previously described except that the ratio of the repeated units of the constitutional components is changed within the predetermined range.

The mixed polyamides according to the present invention can also be obtained by conventional methods such as oligomerization, interfacial polycondensation, fusing polycondensation, solution polycondensation, anion polymerization, molding polymerization and solid-phase polymerization. When the above conventional methods are employed, it will be necessary to choose appropriate materials in accordance with the method employed, for example, diamines, dicarboxylic acids and lactams.

The mixed polyamides having the formulas (A), (B) and (C) according to the present invention can be particularly used as a binder for the thermosensitive image transfer recording medium. In addition, the mixed polyamides can be used as a binder for an ink composition, a hot-melt adhesive and a paper coating agent.

In order to prepare the thermosensitive image transfer recording medium according to the present invention by use of the above-mentioned mixed polyamide according to the present invention, a wax is coated on a support by hot-melting or solution coating to prepare a release layer when necessary. Then a thermofusible ink layer coating liquid which is prepared by kneading or mixing a coloring agent and the above-mentioned low-molecular-weight mixed polyamide is coated on the above prepared release layer in the same manner as in the release layer, to form a thermofusible ink layer, whereby a thermosensitive image transfer recording medium according to the present invention is prepared.

The coloring agents for use in the present invention are conventional organic or inorganic dyes or pigments. Such coloring agents may produce a color when heat is applied to the coloring agents by the heat application device or when the coloring agents come into contact with the material coated on the recording sheet.

It is preferable that the total amount of the coloring agent in the thermofusible ink layer be in the range of 1 to 80 wt.%, more preferably in the range of 5 to 30 wt.%. It is preferable that the amount of the mixed polyamide according to the present invention in the thermofusible ink layer be in the range of 30 to 90 wt.%, more preferably in the range of 50 to 80 wt.%. Furthermore, the thickness of the thermofusible ink layer is preferably in the range of 0.1 to 30 μm, more preferably in the range of 1 to 20 μm.

To the thermofusible ink layer for use in the present invention, a flexibility providing agent such as mineral oils and vegetable oils; a thermal conductivity promoting agent such as finely-divided particles of metals and alloys; a white pigment such as microcrystalline silica, calcium carbonate and kaolin; transfer performance promoting agent such as polyhydric alcohols; and a thermal sensitivity promoting agent such as a wax for example, paraffin wax, polyethylene wax, candelilla wax and carnauba wax), ethylene —vinyl acetate copolymer (EVA), and ethylene—ethyl acrylate copolymer (EEA) can be added.

Specific examples of the support material for use in the present invention are, for example, films made of polyester, polycarbonate, triacetyl cellulose, conventional polyamide resin (nylon 6 and nylon 66) and polyimide resin; glassine; condenser paper; metallic foil, and the composite thereof.

When a thermal head is employed as a heat application device, it is preferable that the thickness of the support material be about 2 to 15 μm. By contrast, when laser beams are employed as the heat application device, which can selectively heat a portion of the thermofusible ink layer, the thickness of the support material is not always restricted to the above mentioned range.

When a thermal head is employed, the heat resistance of the support material can be improved by coating the thermal-head-contacting surface of the support material with a heat resistant protective layer comprising, for instance, silicone resin, fluoroplastics, polyimide resin, epoxy resin, phenolic resin, or melamine resin.

As previously mentioned, according to the present invention, the release layer may be interposed between the support and the thermofusible ink layer.

By placing the release layer between the support and the thermofusible ink layer, the thermofusible ink layer can be easily peeled off the support when the ink composition of the thermofusible ink layer is melted and transferred to the recording sheet. From the viewpoint of the function of the release layer, the release layer is preferably made of the materials which exhibit peak values by differential thermal analysis of 120° C. or less and are easily melted under application of heat to turn into low-viscosity liquids.

Specific examples of the release layer materials are natural waxes such as beeswax, spermaceti, candelilla wax, carnauba wax, rice bran wax and ozokerite, petroleum waxes such as paraffin wax and microcrystalline wax, various modified waxes, hydrogenated waxes, and long chain fatty acids. Among the above examples, the carnauba wax is the most preferable because the carnauba wax itself has sufficient hardness and lubricity. It is preferable that the thickness of the release layer be in the range of 0.1 to 10 μm, more preferably in the range of 1 to 5 μm.

The present invention will now be explained in detail by referring to the following examples. Examples 1 to 5, Examples 6 to 8 and Examples 19 to 25 respectively show the preparation of the mixed polyamides represented by the formulas (A), (B) and (C).

EXAMPLE 1

[Preparation of Mixed Polyamide No. 1]

250 ml of dry chloroform, 5.51 g (0.025 mol) of diethylene glycol bis(3-aminopropyl)ether and 4.41 g (0.025 mol) of ethylene glycol bis(3-aminopropyl)ether were put into a flask with side arm of 500 ml. To this mixture, 50 ml of aqueous sodium hydroxide in which 4.01 g (0.1 mol) of sodium hydroxide was dissolved was added so as to maintain the interface between the water layer and the chloroform layer at the position higher than the joint of the side arm of the flask.

To the thus obtained mixture, 50 ml of a dry chloroform solution in which 5.63 g (0.025 mol) of distilled azelaoyl chloride and 5.98 g (0.025 mol) of distilled sebacoyl chloride were dissolved was added dropwise through a dropping funnel set at the end of the side arm for about 20 minutes, with the flask being stirred slowly so as not to disturb the interface between two layers. After the completion of dropping, the above-prepared mixture was heated at 40° C. for 1 hour.

The thus formed chloroform layer was separated and the component of chloroform was removed therefrom. The resulting precipitate was washed with hot water of 70° C. twice and dried by a vacuum dryer overnight, whereby mixed polyamide No. 1 according to the present invention was obtained in the form of light yellow resin having a melting point of 77° C. to 80° C. The yield was 15.7 g.

The maximum infrared spectrum absorption wavelength of the mixed polyamide No. 1 was as follows:

| | |
|---|---|
| 1,680 cm$^{-1}$ | (—COHN—) |
| 1,120 cm$^{-1}$ | (—CH$_2$—O—CH$_2$—) |

As a result of the molecular weight distribution measurement, the number-average molecular weight of the mixed polyamide No. 1, which was measured by the gel permeation chromatography, was 2,800.

EXAMPLE 2

[Preparation of Mixed Polyamide No. 2]

Example 1 was repeated except that 5.63 g (0.025 mol) of azelaoyl chloride and 5.98 g (0.025 mol) of sebacoyl chloride in the formulation of the mixed polyamide No. 1 employed in Example 1 were replaced by 7.88 g (0.035 mol) of azelaoyl chloride and 3.59 g (0.015 mol) of sebacoyl chloride, whereby mixed polyamide No. 2 according to the present invention was obtained in the form of light yellow resin having a melting point of 72° C. to 75° C. The yield was 16.2 g.

The maximum infrared spectrum absorption wavelength of the mixed polyamide No. 2 was as follows:

| 1,680 cm$^{-1}$ | (—COHN—) |
| --- | --- |
| 1,120 cm$^{-1}$ | (—CH$_2$—O—CH$_2$—) |

As a result of the molecular weight distribution measurement, the number-average molecular weight of the mixed polyamide No. 2, which was measured by the gel permeation chromatography, was 2,800.

EXAMPLE 3

[Preparation of Mixed Polyamide No. 3]

Example 1 was repeated except that 5.51 g (0.025 mol) of diethylene glycol bis(3-aminopropyl)ether and 4.41 g (0.025 mol) of ethylene glycol bis3-amino-propyl)ether in the formulation of the mixed polyamide No. 1 employed in Example 1 were replaced by 7.71 g (0.035 mol) of diethylene glycol bis(3-aminopropyl)ether and 2.64 g (0.015 mol) of ethylene glycol bis(3-aminopropyl)ether, whereby mixed polyamide No. 3 according to the present invention was obtained in the form of light yellow resin having a melting point of 82° C to 88° C. The yield was 15.9 g.

The maximum infrared spectrum absorption wavelength of the mixed polyamide No. 3 was as follows:

| 1,680 cm$^{-1}$ | (—COHN—) |
| --- | --- |
| 1,120 cm$^{-1}$ | (—CH$_2$—O—CH$_2$—) |

As a result of the molecular weight distribution measurement, the number-average molecular weight of the mixed polyamide No. 3, which was measured by the gel permeation chromatography, was 2,700.

EXAMPLE 4

[Preparation of Mixed Polyamide No. 4]

Example 1 was repeated except that 5.63 g (0.025 mol) of azelaoyl chloride and 5.98 g (0.025 mol) of sebacoyl chloride in the formulation of the mixed polyamide No. 1 employed in Example 1 were replaced by 11.26 g (0.05 mol) of azelaoyl chloride, whereby mixed polyamide No. 4 according to the present invention was obtained in the form of light yellow resin having a melting point of 80° C. to 85° C. The yield was 15.3 g.

The maximum infrared spectrum absorption wavelength of the mixed polyamide No. 4 was as follows:

| 1,675 cm$^{-1}$ | (—COHN—) |
| --- | --- |
| 1,120 cm$^{-1}$ | (—CH$_2$—O—CH$_2$—) |

As a result of the molecular weight distribution measurement, the number-average molecular weight of the mixed polyamide No. 4, which was measured by the gel permeation chromatography, was 2,600.

EXAMPLE 5

[Preparation of Mixed Polyamide No. 5]

Example 4 was repeated except that 5.51 g (0.025 mol) of diethylene glycol bis(3-aminopropyl)ether and 4.41 g (0.025 mol) of ethylene glycol bis(3-aminopropyl)ether in the formulation of the mixed polyamide No. 4 employed in Example 4 were replaced by 7.71 g (0.035 mol) of diethylene glycol bis(3-aminopropyl)ether and 2.64 g (0.015 mol) of ethylene glycol bis(3-aminopropyl)ether, whereby mixed polyamide No. 4 according to the present invention was obtained in the form of light yellow resin having a melting point of 87° C. to 90° C. The yield was 16.0 g.

The maximum infrared spectrum absorption wavelength of the mixed polyamide No. 5 was as follows:

| 1,680 cm$^{-1}$ | (—COHN—) |
| --- | --- |
| 1,120 cm$^{-1}$ | (—CH$_2$—O—CH$_2$—) |

As a result of the molecular weight distribution measurement, the number-average molecular weight of the mixed polyamide No. 5, which was measured by the gel permeation chromatography, was 2,800.

EXAMPLE 6

[Preparation of Mixed Polyamide No. 6]

200 ml of dry dichloroethane, 4.68 g (0.02125 mol) of diethylene glycol bis(3-aminopropyl)ether, 3.75 g (0.02125 mol) of ethylene glycol bis[3-aminopropyl)ether, 1.53 g (0.0075 mol) of tetramethylene glycol bis(3-aminopropyl) ether and 10.12 g (0.1 mol) of triethylamine were put into the same flask with side arm as employed in Example 1.

To the thus obtained mixture, 50 ml of a dry dichloroethane solution in which 4.50 g (0.02 mol) of distilled azelaoyl chloride and 7.17 g (0.03 mol) of distilled sebacoyl chloride were dissolved was added dropwise through a dropping funnel set at the end of the side arm for about 20 minutes, with the flask being stirred slowly. After the completion of dropping, the above-prepared mixture was heated at 40° C. for 1 hour.

The thus formed dichloroethane component was removed from the mixture and the resulting precipitate was washed with hot water of 70° C. twice. The thus obtained product was dissolved in 150 ml of ethanol and reprecipitated with water being gradually added, and dried overnight by a vacuum dryer under application of heat, whereby mixed polyamide No. 6 according to the present invention was obtained in the form of light yellow resin having a melting point of 80° C. to 83° C. The yield was 14.8 g.

The maximum infrared spectrum absorption wavelength of the mixed polyamide No. 6 was as follows:

| 1,640 cm$^{-1}$ | (—HNCO—) |
| --- | --- |
| 1,120 cm$^{-1}$ | (—CH$_2$—O—CH$_2$—) |

As a result of the molecular weight distribution measurement, the number-average molecular weight of the mixed polyamide No. 6, which was measured by the gel permeation chromatography, was 6,400.

EXAMPLE 7

[Preparation of Mixed Polyamide No. 7]

Example 6 was repeated except that 4.68 g (0.02125 mol) of diethylene glycol bis(3-aminopropyl)ether, 3.75 g (0.02125 mol) of ethylene glycol bis(3-aminopropyl)ether and 1.53 g (0.0075 mol) of tetramethylene glycol bis(3-aminopropyl)ether in the formulation of the mixed polyamide No. 6 employed in Example 6 were replaced by 4.41 g (0.02 mol) of diethylene glycol bis(3-aminopropyl)ether, 2.64 g (0.015 mol) of ethylene glycol bis(3-aminopropyl)ether and 3.06 g (0.015 mol) of tetramethylene glycol bis(3-aminopropyl) ether, whereby mixed polyamide No. 7 according to the present invention was obtained in the form of light yellow resin having a melting point of 75° C. to 79° C. The yield was 15.5 g.

The maximum infrared spectrum absorption wavelength of the mixed polyamide No. 7 was as follows:

| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 7, which was measured by the gel permeation chromatography, was 6,470.

EXAMPLE 8

[Preparation of Mixed Polyamide No. 8]

Example 6 was repeated except that dry dichloroethane serving as a reaction solvent employed in Example 6 was replaced by dry chloroform, whereby mixed polyamide No. 8 according to the present invention was obtained in the form of light yellow resin having a melting point of 78° C. to 81° C. The yield was 15.2 g.

The maximum infrared spectrum absorption wavelength of the mixed polyamide No. 8 was as follows:

| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 8, which was measured by the gel permeation chromatography, was 2,680.

EXAMPLE 9

[Preparation of Thermosensitive Image Transfer Recording Medium No. 1]

A heat-resistant protective layer made of a polyimide resin was formed on one side of the polyester film serving as a support having a thickness of 3.5 μm. The other side of the polyester film was coated with paraffin wax by hot-melt coating, so that a release layer having a thickness of 3 μm was formed on the polyester film.

A mixture of the following components was coated on the above prepared release layer by a wire bar and dried, so that a thermofusible ink layer having a thickness of 4 μm was formed on the release layer, whereby a thermosensitive image transfer recording medium No. 1 according to the present invention was obtained.

|  | Amount |
|---|---|
| Carbon black | 2.0 g |
| Mixed polyamide No. 1 | 8.0 g |
| Methyl ethyl ketone | 70.0 g |

EXAMPLE 10

[Preparation of Thermosensitive Image Transfer Recording Medium No. 2]

Example 9 was repeated except that the mixed polyamide No. 1 in the formulation of the thermofusible ink layer coating liquid employed in Example 9 was replaced by the mixed polyamide No. 2, whereby a thermosensitive image transfer recording medium No. 2 according to the present invention was obtained.

EXAMPLE 11

[Preparation of Thermosensitive Image Transfer Recording Medium No. 3]

Example 9 was repeated except that the mixed polyamide No. 1 in the formulation of the thermofusible ink layer coating liquid employed in Example 9 was replaced by the mixed polyamide No. 3, whereby a thermosensitive image transfer recording medium No. 3 according to the present invention was obtained.

EXAMPLE 12

[Preparation of Thermosensitive Image Transfer Recording Medium No. 4]

Example 9 was repeated except that the mixed polyamide No. 1 in the formulation of the thermofusible ink layer coating liquid employed in Example 9 was replaced by the mixed polyamide No. 4, and the thickness of the release layer and that of the thermofusible ink layer employed in Example 9 was respectively changed to 4.0 μm and 5.0 μm, whereby a thermosensitive image transfer recording medium No. 4 according to the present invention was obtained.

EXAMPLE 13

[Preparation of Thermosensitive Image Transfer Recording Medium No. 5]

Example 12 was repeated except that the mixed polyamide No. 4 in the formulation of the thermofusible ink layer coating liquid employed in Example 12 was replaced by the mixed polyamide No. 5, whereby a thermosensitive image transfer recording medium No. 5 according to the present invention was obtained.

COMPARATIVE EXAMPLE 1

Example 9 was repeated except that the mixed polyamide No. 1 in the formulation of the thermofusible ink layer coating liquid employed in Example 9 was replaced by ethylene—vinyl acetate copolymer (Trademark "EVAFLEX-410" made by Du Pont—Mitsui Polychemical Co., Ltd.), whereby a comparative thermosensitive image transfer recording medium No. 1 was obtained.

COMPARATIVE EXAMPLE 2

Example 9 was repeated except that the mixed polyamide No. 1 and methyl ethyl ketone in the formulation of the thermofusible ink layer coating liquid employed in Example 9 were respectively replaced by paraffin wax (Trademark "HNP-10" made by Nippon Seiro Co., Ltd.) and toluene, whereby a comparative thermosensitive image transfer recording medium No. 2 was obtained.

EXAMPLE 14

[Preparation of Thermosensitive Image Transfer Recording Medium No. 6]

Example 9 was repeated except that the mixed polyamide No. 1 in the formulation of the thermofusible ink layer coating liquid employed in Example 9 was replaced by the mixed polyamide No. 6, and the thickness of the thermofusible ink layer employed in Example 9 was changed to 1.5 μm, whereby a thermosensitive image transfer recording medium No. 6 according to the present invention was obtained.

EXAMPLE 15

[Preparation of Thermosensitive Image Transfer Recording Medium No. 7]

Example 14 was repeated except that the mixed polyamide No. 6 in the formulation of the thermofusible ink layer coating liquid employed in Example 14 was replaced by the mixed polyamide No. 7, whereby a thermosensitive image transfer recording medium No. 7 according to the present invention was obtained.

EXAMPLE 16

[Preparation of Thermosensitive Image Transfer Recording Medium No. 8]

Example 14 was repeated except that the mixed polyamide No. 6 in the formulation of the thermofusible ink layer coating liquid employed in Example 14 was replaced by the mixed polyamide No. 8, whereby a thermosensitive image transfer recording medium No. 8 according to the present invention was obtained.

EXAMPLE 17

[Preparation of Mixed Polyamide No. 9]

200 ml of dry chloroform, 4.68 g (0.02125 mol) of diethylene glycol bis(3-aminopropyl)ether, 3.75 g (0.02125 mol) of ethylene glycol bis(3-aminopropyl)ether, 1.58 g (0.0075 mol) of 1,3-di-4-piperidylpropane and 10.12 g (0.1 mol) of triethylamine were put into the same flask with side arm as employed in Example 1.

To the thus obtained mixture, 50 ml of a dry chloroform solution in which 4.50 g (0.02 mol) of distilled azelaoyl chloride and 7.17 g (0.03 mol) of distilled sebacoyl chloride were dissolved was added dropwise through a dropping funnel set at the end of the side arm for about 20 minutes, with the flask being stirred slowly. After the completion of dropping, the above-prepared mixture was heated at 40° C. for 1 hour.

The thus formed chloroform component was removed from the mixture and the resulting precipitate was washed with hot water of 70° C. twice. The thus obtained product was dissolved in 150 ml of ethanol and reprecipitated with water being gradually added, and dried overnight by a vacuum dryer under application of heat, whereby mixed polyamide No. 9 according to the present invention was obtained in the form of light yellow resin having a melting point of 78° C. to 82° C. The yield was 15.2 g.

The maximum infrared spectrum absorption wavelength of the mixed polyamide No. 9 was as follows:

| | |
|---|---|
| 1,660 cm$^{-1}$, 1,650 cm$^{-1}$ | (>NCO—) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 9, which was measured by the gel permeation chromatography, was 2,600.

[Preparation of Thermosensitive Image Transfer Recording Medium No. 9]

Example 9 was repeated except that the mixed polyamide No. 1 in the formulation of the thermofusible ink layer coating liquid employed in Example 9 was replaced by the mixed polyamide No. 9, whereby a thermosensitive image transfer recording medium No. 9 according to the present invention was obtained.

EXAMPLE 18

[Preparation of Mixed Polyamide No. 10]

Example 17 was repeated except that dry chloroform serving as a reaction solvent employed in Example 17 was replaced by dry dichloroethane, whereby mixed polyamide No. 10 according to the present invention was obtained in the form of light yellow resin having a melting point of 79° C. to 82° C. The yield was 15.0 g.

The maximum infrared spectrum absorption wavelength of the mixed polyamide No. 10 was as follows:

| | |
|---|---|
| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 10, which was measured by the gel permeation chromatography, was 6,080.

[Preparation of Thermosensitive Image Transfer Recording Medium No. 10]

Example 9 was repeated except that the mixed polyamide No. 1 in the formulation of the thermofusible ink layer coating liquid employed in Example 9 was replaced by the mixed polyamide No. 10, whereby a thermosensitive image transfer recording medium No. 10 according to the present invention was obtained.

EXAMPLE 19

[Preparation of Mixed Polyamide No. 11]

Example 17 was repeated except that 4.68 g (0.02125 mol) of diethylene glycol bis(3-aminopropyl)ether, 3.75 g (0.02125 mol) of ethylene glycol bis(3-aminopropyl)ether and 1.58 g (0.0075 mol) of 1,3-di-4-piperidylpropane in the formulation of the mixed polyamide No. 9 employed in Example 17 were replaced by 4.41 g (0.02 mol) of diethylene glycol bis(3-aminopropyl)ether, 3.53 g (0.02 mol) of ethylene glycol bis(3-aminopropyl)ether and 2.10 g (0.01 mol) of 1,3-di-4-piperidylpropane, whereby mixed polyamide No. 11 according to the present invention was obtained in the form of light yellow resin having a melting point of 71° C. to 78° C. The yield was 16.1 g.

The maximum infrared spectrum absorption wavelength of the mixed polyamide No. 12 was as follows:

| | |
|---|---|
| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 11, which was measured by the gel permeation chromatography, was 2,710.

EXAMPLE 20

[Preparation of Mixed Polyamide No. 12]

Example 19 was repeated except that dry chloroform serving as a reaction solvent employed in Example 19 was replaced by dry dichloroethane, whereby mixed polyamide No. 12 according to the present invention was obtained in the form of light yellow resin having a melting point of 75° C. to 81° C. The yield was 16.6 g.

The maximum infrared spectrum absorption wavelength of the mixed polyamide No. 12 was as follows:

| | |
|---|---|
| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 12, which was measured by the gel permeation chromatography, was 6,080.

EXAMPLE 21

[Preparation of Mixed Polyamide No. 13]

Example 17 was repeated except that the formulation of the mixed polyamide No. 9 employed in Example 17 was replaced as given in Table 1, whereby mixed polyamide No. 13 according to the present invention was obtained in the form of light yellow resin having a melting point of 88° C. to 92° C. The yield was 16.0 g.

TABLE 1

| Component | Amount |
|---|---|
| Diethylene glycol bis(3-aminopropyl)ether | 3.30 g (0.015 mol) |
| Ethylene glycol bis(3-aminopropyl)ether | 3.53 g (0.02 mol) |
| 1,3-di-4-piperidylpropane | 3.16 g (0.015 mol) |
| Azelaoyl chloride | 2.25 g (0.01 mol) |
| Sebacoyl chloride | 9.57 g (0.04 mol) |

The maximum infrared spectrum absorption wavelength of the mixed polyamide No. 13 was as follows:

| | |
|---|---|
| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 13, which was measured by the gel permeation chromatography, was 2,850.

EXAMPLE 22

[Preparation of Mixed Polyamide No. 14]

Example 17 was repeated except that 4.68 g (0.02125 mol) of diethylene glycol bis(3-aminopropyl)ether, 3.75 g (0.02125 mol) of ethylene glycol bis(3-aminopropyl)ether and 1.58 g (0.0075 mol) of 1,3-di-4-piperidylpropane in the formulation of the mixed polyamide No. 9 employed in Example 17 were replaced by 4.19 g (0.019 mol) of diethylene glycol bis (3-aminopropyl)ether, 3.35 g (0.019 mol) of ethylene glycol bis(3-aminopropyl)ether and 2.52 g (0.012 mol) of 1,3-di-4-piperidylpropane, and dry chloroform serving as a reaction solvent employed in Example 17 was replaced by dry dichloroethane, whereby mixed polyamide No. 14 according to the present invention was obtained in the form of light yellow resin having a melting point of 78° C. to 90° C. The yield was 16.7 g.

The maximum infrared spectrum absorption wavelength of the mixed polyamide No. 14 was as follows:

| | |
|---|---|
| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 14, which was measured by the gel permeation chromatography, was 5,910.

EXAMPLE 23

[Preparation of Mixed Polyamide No. 15]

Example 17 was repeated except that the formulation of the mixed polyamide No. 9 employed in Example 17 was replaced as given in Table 2, and dry chloroform serving as a reaction solvent employed in Example 17 was replaced by dry dichloroethane, whereby mixed polyamide No. 15 according to the present invention was obtained in the form of light yellow resin having a melting point of 78° C. to 95° C. The yield was 16.4 g.

TABLE 2

| Component | Amount |
|---|---|
| Diethylene glycol bis(3-aminopropyl)ether | 2.20 g (0.01 mol) |
| Ethylene glycol bis(3-aminopropyl)ether | 1.76 g (0.01 mol) |
| 1,3-di-4-piperidylpropane | 6.31 g (0.03 mol) |
| Azelaoyl chloride | 5.63 g (0.025 mol) |
| Sebacoyl chloride | 5.98 g (0.025 mol) |

The maximum infrared spectrum absorption wavelength of the mixed polyamide No. 15 was as follows:

| | |
|---|---|
| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 15, which was measured by the gel permeation chromatography, was 6,550.

EXAMPLE 24

[Preparation of Mixed Polyamide No. 16]

Example 17 was repeated except that the formulation of the mixed polyamide No. 9 employed in Example 17 was replaced as given in Table 3, and dry chloroform serving as a reaction solvent employed in Example 17 was replaced by dry dichloroethane, whereby mixed polyamide No. 16 according to the present invention was obtained in the form of light yellow resin having a melting point of 82° C. to 98° C. The yield was 16.5 g.

TABLE 3

| Component | Amount |
|---|---|
| Diethylene glycol bis(3-aminopropyl)ether | 3.30 g (0.015 mol) |
| Ethylene glycol bis(3-aminopropyl)ether | 2.64 g (0.015 mol) |
| 1,3-di-4-piperidylpropane | 4.21 g (0.02 mol) |
| Azelaoyl chloride | 6.75 g (0.03 mol) |
| Sebacoyl chloride | 4.78 g (0.02 mol) |

The maximum infrared spectrum absorption wavelength of the mixed polyamide No. 16 was as follows:

| 1,660 cm$^{-1}$, 1,650 cm$^{-1}$ | (>NCO) |
| 1,640 cm$^{-1}$ | (—HNCO—) |
| 1,120 cm$^{-1}$ | (—CH$_2$—O—CH$_2$—) |

As a result of the molecular weight distribution measurement, the number-average molecular weight of the mixed polyamide No. 16, which was measured by the gel permeation chromatography, was 6,340.

EXAMPLE 25

[Preparation of Thermosensitive Image Transfer Recording Medium No. 11]

A heat-resistant protective layer made of a polyimide resin was formed on one side of the polyester film serving as a support having a thickness of 3.5 μm. The other side of the polyester film was coated with paraffin wax by hot-melt coating, so that a release layer having a thickness of 3 μm was formed on the polyester film.

A mixture of the following components was coated on the above prepared release layer by a wire bar and dried, so that a thermofusible ink layer having a thickness of 1.5 μm was formed on the release layer, whereby a thermosensitive image transfer recording medium No. 11 according to the present invention was obtained.

| | Amount |
|---|---|
| Carbon black | 2.0 g |
| Mixed polyamide No. 9 | 8.0 g |
| Methyl ethyl ketone | 70.0 g |

EXAMPLES 26 TO 31

Example 25 was repeated except that the mixed polyamide No. 9 employed in Example 25 was respectively replaced by the mixed polyamides No. 11 to 16 according to the present invention, whereby thermosensitive image transfer recording media No. 12 to 17 according to the present invention were obtained.

Each of the thus obtained thermosensitive image transfer recording media No. 1 to No. 17 according to the present invention was incorporated into a thermosensitive image transfer printer. By use of a sheet of plain paper having a smoothness of 25 seconds in terms of Bekk's smoothness, each thermosensitive image transfer recording medium was subjected to the image transfer recording test, with the applied thermal energy set to 14 mJ/dot and at a recording speed of 150 characters/sec.

The results of the above recording test are shown in Table 4.

TABLE 4

| Example No. | Thermosensitive Image Transfer Recording Medium No. | Resolution | Results |
|---|---|---|---|
| Example 9 | No. 1 | o | Characters are remarkably clear. |
| Example 10 | No. 2 | o | Characters are remarkably clear. |
| Example 11 | No. 3 | o | Characters are remarkably clear. |
| Comparative Example 1 | Comparative thermosensitive image transfer recording medium No. 1 | x | Characters are illegible due to chipping (characters partially unprinted). |
| Comparative Example 2 | Comparative thermosensitive image transfer recording medium No. 2 | Δ | Characters are blurred and unclear. |
| Example 12 | No. 4 | o | Characters are remarkably clear. |
| Example 13 | No. 5 | o | Characters are remarkably clear. |
| Example 14 | No. 6 | o | Characters are remarkably clear. |
| Example 15 | No. 7 | o | Characters are remarkably clear. |
| Example 16 | No. 8 | o | Characters are remarkably clear. |
| Example 17 | No. 9 | o | Characters are remarkably clear. |
| Example 18 | No. 10 | o | Characters are remarkably clear. |
| Example 25 | No. 11 | o | Characters are remarkably clear. |
| Example 26 | No. 12 | o | Characters are remarkably clear. |
| Example 27 | No. 13 | o | Characters are remarkably clear. |
| Example 28 | No. 14 | o | Characters are remarkably clear. |
| Example 29 | No. 15 | o | Characters are remarkably clear. |
| Example 30 | No. 16 | o | Characters are remarkably clear. |
| Example 31 | No. 17 | o | Characters are remarkably clear. |

(Note)
o: Clear characters are obtained just like by typography.
Δ: Characters are slightly unclear, but can be read.
x: Characters are extremely unclear and illegible.

According to the present invention, a mixed polyamide and a thermosensitive image transfer recording medium using the above mixed polyamide are provided.

The thermosensitive image transfer recording medium according to the present invention shows excellent thermal image transfer performance, particularly when high-speed image transfer is carried out and furthermore, produces remarkably clear images with high resolution on a recording sheet. This is because the thermosensitive image transfer recording medium according to the present invention comprises as a binder agent a low-molecular-weight mixed polyamide having an ether linkage therein.

Since the molecular weight of this mixed polyamide lies in the middle of that of a wax and a low-melting point resin, both of which are conventionally used as a binder agent for the thermosensitive image transfer recording medium, the shortcomings of the conventional recording media due to the molecular weight of the binder can be solved by the thermosensitive image transfer recording medium using this mixed polyamide according to the present invention.

In addition, the mixed polyamide according to the present invention comprises an amide group in the molecule thereof, so that the fixing performance of the obtained images to a recording sheet is further improved. The moiety of an ether group forms the structure of a nonionic surface active agent, so that the wetting property of this recording medium toward the recording sheet is increased. As a result, the transfer performance of images can be further improved during high-speed image transfer recording.

What is claimed is:

1. A thermofusible ink layer for a thermosensitive image transfer recording medium, which ink layer comprises a binder agent and coloring agent which is dispersed in the binder agent, said binder agent consisting essentially of a low-molecular weight mixed polyamide selected from the group consisting of (i), (ii), and (iii) wherein (i) is of the formula (A):

wherein X is a combination of the radicals $-(CH_2-)_7$ and $-CH_2-_8$ in a ratio of 20 to 100: 80 to 0 in the polyamide and Y is a combination of the radicals $-(C_3H_6O-C_2H_4O-C_2H_4OC_3H_6)-$ and $-C_3H_6OC_2H_4OC_3H_6-$ at a ratio ranging from 20 to 80: 80 to 20 in the polyamide;

wherein (ii) is of formula (B):

$$-(CO-X-COHN-Y'-NH)- \quad (B)$$

wherein X is as defined above, and Y' is a combination of the radicals $C_3H_6OC_2H_4OC_2H_4OC_3H_6$, $C_3H_6OC_2H_4OC_3H_6$ and $C_3H_6OC_4H_8OC_3H_6$ at a ratio ranging from 5 to 90: 5 to 90: 5 to 90 in the polyamide;

and wherein (iii) is of formula (C):

$$-(CO-X-CO-Y'')- \quad (C)$$

wherein X is as defined above, and Y" is a combination of the radicals $-(HNC_3H_6OC_2H_4OC_2H_4OC_3H_6NH)-$, $-(HNC_3H_6OC_2H_4OC_3H_6NH)-$ and

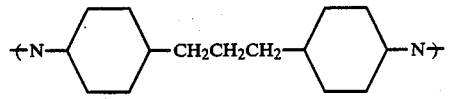

in a ratio ranging from 10 to 10 to 80: 10 to 80 in the polyamide.

2. The thermofusible ink layer as claimed in claim 1, wherein the number average molecular weight of said low-molecular-weight mixed polyamide is in the range of 2,000 to 10,000.

3. The thermofusible ink layer as claimed in claim 1, wherein the melting point of said low-molecular-ewight mixed polyamide is in the range of 60° to 150° C.

4. The thermofusible ink layer of claim 1, wherein the total amount of coloring agent in the thermofusible ink layer ranges from 1 to 80 wt.%.

5. The thermofusible ink layer of claim 1, wherein the total amount of said low molecular weight mixed polyamide in the thermofusible ink layer ranges from 30 to 90 wt.%.

* * * * *

UNITED STATES PATENT AND TRADEMARK OFFICE
CERTIFICATE OF CORRECTION

PATENT NO. : 4,978,709

DATED : DECEMBER 18, 1990

INVENTOR(S) : KEISHI TANIGUCHI ET AL

It is certified that error appears in the above-identified patent and that said Letters Patent is hereby corrected as shown below:

Cover page, under [57] ABSTRACT, line 11, "wherein S, Y, Y' and Y" are defined in the specification," should read --wherein X, Y, Y' and Y" are defined in the specification,--.

Column 2, line 44, "CO$\{$X-COHN-Y-NH$\}$" should read

-- $\{$CO-X-COHN-Y-NH$\}$ --.

Column 7, line 67, "polyamide No. 4" should read

--polyamide No. 5--.

Column 12, line 51, "polyamide No. 12" should read

--polyamide No. 11--.

Column 17, line 20, "$\{CH_2\}_7$" should read -- $\{CH_2\}_7$ --;

line 21, "$-CH_2-_8$" should read -- $\{CH_2\}_8$ --;

lines 23 and 24, "$-C_3H_6OC_2H_4OC_3H_6-$" should read

-- $\{C_3H_6OC_2H_4OC_3H_6\}$ --;

line 32, "$C_3H_6OC_2H_4OC_2H_4OC_3H_6$, should read

-- $\{C_3H_6OC_2H_4OC_2H_4OC_3H_6\}$, --;

line 33, "$C_3H_6OC_2H_4OC_3H_6$ and $C_3H_6OC_4H_8OC_3H_6$ at a" should read

-- $\{C_3H_6OC_2H_4OC_3H_6\}$ and $\{C_3H_6OC_4H_8OC_3H_6\}$ at a--.

UNITED STATES PATENT AND TRADEMARK OFFICE
CERTIFICATE OF CORRECTION

PATENT NO. : 4,978,709

DATED : DECEMBER 18, 1990

INVENTOR(S) : KEISHI TANIGUCHI ET AL

It is certified that error appears in the above-identified patent and that said Letters Patent is hereby corrected as shown below:

Column 18, line 8, "$\{HNC_3H_6OC_2h_4OC_2\}$" should read

-- $\{HNC_3H_6OC_2H_4OC_2\}$ --;

line 24, "low-molecular-ewight" should read

--low-molecular-weight--.

Signed and Sealed this

Ninth Day of March, 1993

*Attest:*

STEPHEN G. KUNIN

*Attesting Officer*   Acting Commissioner of Patents and Trademarks